US006402950B1

(12) United States Patent
Nix et al.

(10) Patent No.: US 6,402,950 B1
(45) Date of Patent: Jun. 11, 2002

(54) DEVICE FOR MULTIPLE SAMPLE PROCESSING

(75) Inventors: Paul T. Nix, Jackson, NJ (US); Dennis R. Stocker, Yardley; Michael J. Byers, Spring Mills, both of PA (US)

(73) Assignee: Princeton Separations, Freehold, NJ (US)

( * ) Notice: Subject to any disclaimer, the term of this patent is extended or adjusted under 35 U.S.C. 154(b) by 0 days.

(21) Appl. No.: 09/665,860

(22) Filed: Sep. 20, 2000

Related U.S. Application Data

(60) Provisional application No. 60/155,275, filed on Sep. 20, 1999.

(51) Int. Cl.[7] ............................ B01D 35/00; B01L 3/00

(52) U.S. Cl. .................... 210/323.2; 210/359; 210/466; 210/473; 210/474; 210/483; 422/72; 422/101; 422/102; 422/104; 435/305.2; 436/177; 436/178

(58) Field of Search .............................. 210/359, 323.2, 210/466, 473, 474, 483; 422/101, 102, 104, 72; 435/305.2; 436/177, 178

(56) References Cited

U.S. PATENT DOCUMENTS

| | | | | | |
|---|---|---|---|---|---|
| 4,160,803 | A | * | 7/1979 | Potts | 422/104 |
| 5,620,663 | A | * | 4/1997 | Aysta et al. | 422/104 |
| 5,650,068 | A | * | 7/1997 | Chachowski et al. | 422/101 |
| 5,650,125 | A | * | 7/1997 | Bosanquet | 422/102 |

* cited by examiner

*Primary Examiner*—David A. Reifsnyder
(74) *Attorney, Agent, or Firm*—Hoffman & Baron, LLP

(57) ABSTRACT

A device which can be used for filtering samples is described. The device is comprised of a plurality of filter wells, each having a wide region and a narrow region. The device is fitted with a filter element and then filled with a gel filtration matrix which is selected so that molecules of a particular molecular size will diffuse into the matrix. The device is centrifuged to remove water from the interstitial regions of the gel filtration matrix, and a sample is then added to the device containing the dried gel filtration matrix. The device is again centrifuged, causing smaller molecules to diffuse into the matrix and allowing larger molecules to exit the device, wherein they are collected and analyzed. The device is capable of filtering sample sizes as low as 1 $\mu$L and can be used in a variety of existing laboratory equipment, including bench-top centrifuges and microcentrifuges. A process for using the device is also disclosed.

16 Claims, 4 Drawing Sheets

DEVICE FOR MULTIPLE SAMPLE PROCESSING

This application claims priority of U.S. Provisional Application No. 60/155,275, filed on Sep. 20. 1999.

FIELD OF THE INVENTION

The present invention relates generally to a device for separating molecules on the basis of their size. More particularly, the present invention relates to a device for separating molecules on the basis of their size where the device is adapted to work in a multitude of centrifugation devices and allows for the separation of molecules in a very small sample size.

BACKGROUND OF RELATED TECHNOLOGY

In the course of experiments, assays, or analytical measurements, it is often necessary or desirable to separate components in a mixture. Such separations may be accomplished by a variety of methods, including, but not limited to, salt precipitation, solvent precipitation, adsorption, and chromatography. The method of separation that is chosen is often selected with reference to the characteristics and stability of the molecular species being separated.

When it is desired to separate molecular species of different sizes, gel filtration chromatography, also known to those familiar with the art as size exclusion chromatography, is the method often chosen. Technically, gel filtration chromatography refers to the separation of components in an aqueous environment, while size exclusion chromatography refers to the separation of components in a non-aqueous environment. However, it is understood to those familiar with the art that these terms are considered interchangeable and may be used synonymously. Commercial chromatography materials which can be used in conducting gel filtration separations are readily available from several manufacturers such as Amersham Pharmacia Biotech, Bio-Rad, TosoHaas, or Whatman. This technology is well-known by those familiar with the art.

Gel filtration chromatography is typically carried out by a gel filtration matrix contained within a column. This column typically has vertical dimensions which are greater than its diameter. A mixture of molecular species is applied to this gel filtration matrix. The mixture, also known as a plug, then moves in a continuous stream of liquid which flows through the matrix. As the plug moves through the matrix, small molecules in the mixture diffuse into the pores of the matrix while large molecules do not. The particular gel filtration matrix that is chosen will determine the size of the molecules that will diffuse into it. As a result of this diffusion, larger molecules will emerge from the outlet of the column first, followed by the smaller molecules. The time between the emergence of the molecules is sufficient to allow the molecules to be separated based on their relative molecular sizes. A separation of this type may also be conducted in a batch mode, wherein several samples are introduced sequentially into the gel filtration device.

Gel filtration chromatography is effective for large sample volumes and is often used in industrial applications. However, it is difficult to process small samples (less than 1 mL) in this way. Small samples require the use of complicated and expensive equipment to detect the molecules of various sizes as they emerge from the column and to collect each small sample separately.

When the desired molecular species to be separated from a sample has a molecular weight greater than about 10,000 MW, and the sample size is about 1 mL to about 100 mL, then dialysis may be used to remove molecular species below about 10,000 MW. For smaller sample volumes, such as between about 100 μL and 1 mL, dialysis devices may be used to remove these smaller species. This technique is sometimes called "desalting." However, this process requires several hours and the extent of removal of the small species may only reach 90–99%.

Accordingly, the above methods are not desirable when very small samples are being processed or where a very effective removal of small molecular weight molecules must be achieved. In these situation, single-sample spin columns filled with gel filtration material and designed to be used in microcentrifuges are used. These spin columns, available either hydrated or with a dehydrated dry mix gel filtration material, are available from several manufacturers. For example, CENTRI-SEP and CENTRI-SPIN spin columns are available from Princeton Separations. Additionally, MICROSPIN™ columns are available from Pharmacia and SEQueaky KLeen columns are available from BioRad. These columns contain an amount of gel filtration material that, when swollen, allows recovery of high molecular weight molecules from samples of 20 μL to 100 μL in volume.

In operation, these hydrated spin columns are inserted into a centrifuge tube, known as a wash tube, and are centrifuged at a relative centrifugal force. The liquid outside the pores of the filtration matrix, known as interstitial fluid, is expelled from the spin column into the wash tube and is then discarded. The sample mixture is then added to the partially dried spin column and the spin column is inserted into a second centrifuge tube, known as a collection tube, and again centrifuged at a relative centrifugal force. This centrifugation causes small molecules in the sample to diffuse into the pores of the gel filtration material. The interstitial fluid is then expelled from the column and collected in the collection tube. The desired large molecular weight molecules are found in the expelled liquid in approximately the same volume as they existed in the original sample.

Gel filtration chromatography has many applications. This type of separation is useful in a number of assays, reaction cleanup steps, and analytical sample preparation. For instance, it may be used in the removal of non-incorporated radioactive nucleotides following an enzymatic labeling reaction of nucleic acid fragments, in the removal of non-incorporated fluorescent dyes following a protein labeling reaction, such as the labeling of an antibody, in the removal of salts and buffers from samples prior to analysis by capillary electrophoresis or mass spectrometry, or in the removal of non-incorporated labeled precursors from reactions prior to analysis of samples for automated DNA sequence determination.

Laboratories operating automated fluorescent DNA sequencing may process 20 to 2000 samples in one day. As such, single-sample spin columns are not suitable for the very high throughput labs at the high end of this range. The requirements of these laboratories are met by the availability of filter plates in the standard 96 well microtiter dish format. In this format, 96 individual wells are concentrically arranged in an 8 by 12 array. These wells are filled with a gel filtration material similar to that in the single spin columns. These filled 96 well filter plates are available from several manufacturers including Princeton Separations, Edge BioSystems, Sigma and BioRad. These filter plates are processed in a similar fashion as individual spin columns with the exception that these plates may accept samples as small as 5 $\mu$L and require a special swing-out rotor to accommodate these 96 well plates in a bench-top centrifuge instead of the more common microcentrifuge. Of course, these plates are most efficient if 96 samples are being processed. Further, when these plates are used in applications requiring very efficient removal of small molecules (>99.99%) such as automated DNA sequencing, the techniques used in applying samples to the wells are extremely critical. Poor sample application technique can easily reduce the efficiency of removal to 90% or less.

As a result of the inability of current microcentrifugation techniques to process very small sample volumes and the inability of bench-top centrifugation techniques to process small numbers of samples and to easily remove small molecules with efficiency greater than 99.99%, a need exists for a device which will allow for very small sample volumes to be processed in a gel filtration technique while permitting a removal effectiveness greater than 99.99% and which can be operated in readily available equipment with little or no modification. The present invention is directed towards meeting these and other needs.

SUMMARY OF THE INVENTION

Figure 1:
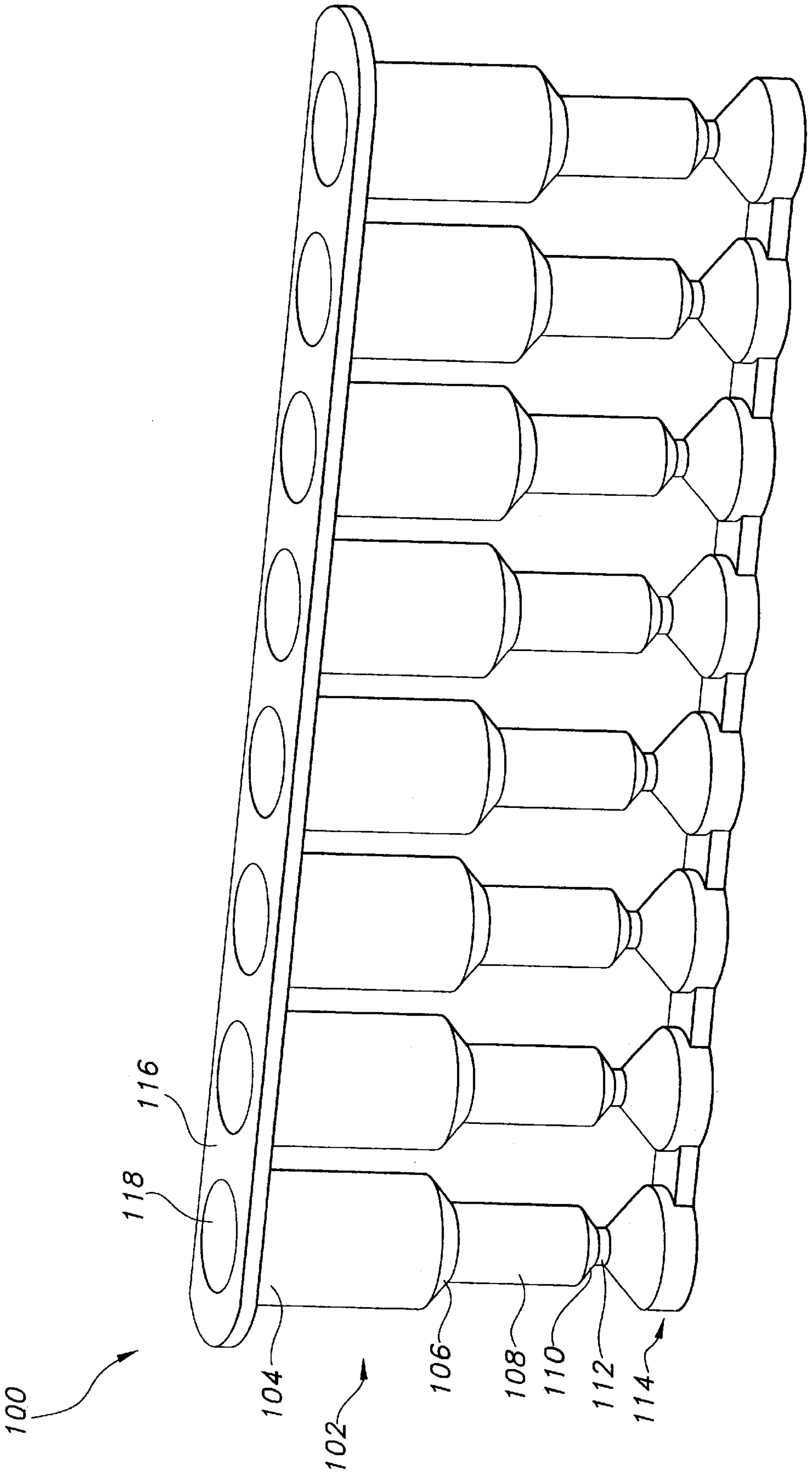
FIG. 1 is a longitudinal view of the device of the present invention.

In one aspect of the present invention, there is provided a device for separating molecules on the basis of their size. This device includes a plurality of filter wells which may be filled with a gel filtration material. Each filter well is capable of containing a sample volume from 1 $\mu$L to 100 $\mu$L. The filter wells are connected by means of an integral tab along an open end of the wells and are removably closed on the opposite end of each well. The device is constructed so that it is capable of being used in readily available equipment, such as bench-top centrifuges and vacuum drying instruments, with little or no modification required to the equipment. In another aspect of the invention, there is provided a process of filtering a fluid sample, such as separating a mixture of molecules on the basis of their size, using the device of the present invention.

DETAILED DESCRIPTION OF THE INVENTION

The present invention is directed towards a device that can be used with readily available laboratory equipment, such as centrifuges and vacuum drying instruments, and functions to separate molecules of different sizes from liquid samples. The device consists of a plurality of filter wells, desirably a strip of 4 to 8, each of which consists of an upper cylindrical housing and a lower cylindrical housing. The upper cylindrical housing narrows at one end to the lower cylindrical housing. As such, the upper cylindrical housing has a diameter greater than that of the lower cylindrical housing. Each filter well is open to the atmosphere on an end of the upper cylindrical housing opposite the end that is attached to the lower cylindrical housing. Each filter well is also provided with a removable closure member on the end of the lower cylindrical housing opposite the end that is attached to the upper cylindrical housing.

In one aspect of the invention, there is included a device for filtering a fluid sample, said device including a plurality of filter wells, each of said filter wells comprising a generally elongate tubular body having a first region with a first diameter and a second region with a second diameter, each of said wells having an opening for receiving sample material located at an end of the tubular body and a dispense opening at its opposite end for dispensing a filtered material, said plurality of filter wells being integrally joined to adjacent wells by one or more joining members. In a desired aspect of the invention, the first region has a diameter greater than that of the second region. It is contemplated that the two regions may be joined by a transition region. The transition region may have a third diameter and is desirably conically shaped. In such a case, the transition region decreases from said first region to said second region.

In another aspect of the invention, there is included a device for filtering a fluid sample, said device including from two to eight filter wells, each of said filter wells comprising a generally elongate tubular body, desirably about one inch in length, having a first region with a first diameter and a second region with a second diameter smaller than said first diameter, each of said wells having an opening for receiving sample material located at an end of the tubular body and a dispense opening at its opposite end for dispensing a filtered material, said plurality of filter wells being integrally joined to adjacent wells by a planar connecting strip which is substantially planar to said openings, wherein said filter wells are linearly aligned.

In one desired aspect of the invention, the first diameter of the first region is approximately seven millimeters and said second diameter of the second region is approximately five millimeters.

The present invention also includes a process for filtering a fluid sample, said process including the steps of: a) providing a device comprising a plurality of filter wells, each of said filter wells comprising a generally elongate tubular body having a first region with a first diameter and a second region with a second diameter, each of said wells having an opening for receiving sample material located at an end of the tubular body and a dispense opening at its opposite end for dispensing a filtered material, said plurality of filter wells being integrally joined to adjacent wells by one or more joining members; b) placing a fluid sample into said device; and c) subjecting said sample in said device to centrifugation.

In a further aspect of the invention, there is included a process for filtering a fluid sample, said process including the steps of: a) providing a device comprising from two to eight filter wells, each of said filter wells comprising a one inch, generally elongate tubular body having a first region with a first diameter and a second region with a second diameter smaller than said first diameter, each of said wells having an opening for receiving sample material located at an end of the tubular body and a dispense opening at its opposite end for dispensing a filtered material, said plurality of filter wells being integrally joined to adjacent wells by a planar connecting strip which is substantially planar to said openings, wherein said filter wells are linearly aligned; b) placing a fluid sample into said device; and c) centrifuging said device containing said sample.

Figure 4:
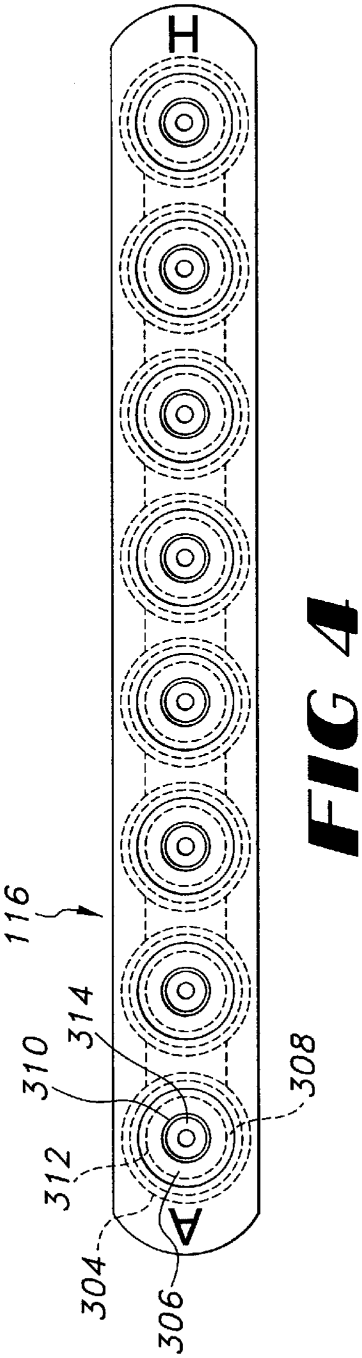
FIG. 4 is a top view of the device of the present invention.

The filter wells are connected by means of an integral tab such that they constitute a single strip even when the closure members on the lower cylindrical housings have been removed. This integral tab may have markings which allow the user to orient the device. FIG. 4 shows examples of such orientation markings, "A" and "H", as they may exist on the integral tab. This integral tab may be of any suitable dimensions, but is preferably about 75 to 90 mm in length and about 9 mm in width, in order that the device will fit into existing equipment. The filter wells are desirably aligned 9 mm on center and the wells are approximately 7 mm in diameter over the majority of their volume.

In one aspect of the invention, the upper barrel of each filter well has an outer wall diameter of about 8 mm and an inner wall diameter of about 6 mm. The lower barrel may have any diameter that is suitable for purposes of the present invention. Preferably, the lower barrel has an outer wall diameter of 5 mm and in inner wall diameter of 3 mm. The length of the filter wells can be of any suitable length such that the device will be compatible with the centrifugation equipment into which it will be placed. Preferably, this length will be 25 mm, as this is the standard length of devices that are compatible with centrifugation devices with which the current invention is designed to work. These dimension match the standard dimensions of 96 well micro-titer dishes and associated plasticware, hardware, and instrumentation. When the device of the present invention consists of eight filter wells, twelve of these devices placed adjacent to one another have the same array dimensions (8 columns by 12 rows) on exactly the same well-to-well measurements as the typical 96 well device. To facilitate using these devices in conjunction with a 96 well plate for purposes such as centrifugation in a typical 96 well plate centrifuge rotor or drying of samples in a 96 well format drying device such as Speed Vac (Savant Instruments), the main barrel of each filter well is narrowed at the filter end to allow insertion of the device into a typical 96 well assay plate. This feature allows the device to be used in protocols similar to the protocol used, and described above, for single-sample spin columns.

Additionally, the lower filter end of each filter well is sufficiently narrow so as to allow the insertion of the filter end of the device into a plastic tube strip in an 8 tube format or in a 96 (8×12) tube format. This plasticware is commercially available and is typically known as 0.2 mL PCR tubes or 0.2 mL PCR plates and are designed to fit into commercial PCR thermocycling devices. These PCR tubes, in either 8 tube or 96 tube formats, typically have an opening with a diameter of less than 5 mm. In the present invention, it was also found that the introduction of the reduced barrel diameter to allow insertion of the device into existing 8 and 96 tube PCR plasticware also resulted in superior performance as demonstrated by the efficiency of removal of low molecular weight materials relative to a device of the same matrix volume, but having a uniform barrel diameter.

The filter wells may be made of any suitable material. For the purposes of the present invention, suitable material include, but are not limited to injection-molded thermoplastics, such as polypropylene and polyethylene. A filter element is placed into the lower cylindrical housing of each filter well and a gel filtration matrix is subsequently added. The filter element, known to those in the art as a fit, can be made of any porous material. Desirably, the filter element is made of porous polyethylene or polypropylene, but other porous materials, such as, for example, sintered glass and glass wool, may be used. The filter element can have any dimensions which will allow it to fit within the lower cylindrical portion of the filter wells. Desirably, a filter element used in a device of the present invention will be cylindrical and will have dimensions of ⅛ inch in height and ⅛ inch in diameter. The filter wells can be used immediately after the addition of the gel filtration matrix or the open end of the filter wells may be sealed and the device used at a later time.

In typical use, the closed filter end of one or more of the devices of the present invention would be opened by removing an enclosure on the filter end by cutting along a parting line with scissors. The film or foil on the integral tab end would be removed and the devices placed in a 96 well closed bottom plate. This combination would be placed into a micro-plate rotor of a bench-top or similar centrifuge and centrifuged at 1500 relative centrifugal force×Gravity for 2 minutes to remove the interstitial fluid. After centrifugation, the device would be removed from the first 96 well plate and the liquid removed and discarded from the first plate. Samples of from 1 $\mu$L to 100 $\mu$L would be added to one or more of the 8 filter wells in one or more of the devices previously spun to remove interstitial fluid. Then, either a 96 tube PCR plate, or an equal number of 8 tube PCR strips and prepared filtration devices, would be placed into the first 96 well closed bottom plate. In this instance, the 96 well closed bottom plate acts only as a holder for the PCR tube plate or strips. The prepared filtration devices, with the samples already applied, are inserted into the PCR tubes in such a way that the each filter well of the devices which contains a sample is aligned with and inserted into a PCR tube. The 96 well plate, PCR tube, and device combination is centrifuged as before for 2 minutes at approximately 1500 relative centrifugal force×Gravity. At the end of the centrifugation time, the filtration devices are discarded and the samples are recovered in the PCR tube strips or plates for further processing. The desired molecular weight molecules are found in the expelled liquid in approximately the same volume as the original sample.

The utility of the filtration device as used with the 8 tube PCR strip is recognized by understanding that many laboratories for whom use of the filtration device is desired do not have access to the type of bench-top centrifuge or equivalent with a micro plate rotor, as described above. These centrifuges are very expensive. However, most molecular biology, biochemistry, and analytical laboratories have access to vacuum drying instruments such as the Speed-Vac (Savant Instruments) or equivalent. Inexpensive microplate rotors suitable for drying samples are available for these instruments from the manufacturer. While these rotors often do not accommodate a 96 well plate in combination with existing filtration devices due to limitations on the chamber size and the radius available to a full 96 well plate, the rotors are easily and inexpensively modified to contain 8 tube PCR strips with filtration devices inserted. Such modifications include incorporating a fixture which may be a block approximately 5 cm by 10 cm into the base of the swinging platform of a micro-plate rotor. This fixture is attachable to a rotor of a centrifugation device. The fixture comprises a generally elongate body having a length, opposing sides, a top, and a bottom, said top being adapted to receive the device of the present invention. Such a fixture may be made of wood, metal, plastic, or other suitable material. This block may be machined, molded, or caused by other means known to the art, to have a series of at least 8 holes approximately 6 mm in diameter and located on 9 mm centers, such that an 8 tube PCR strip may be easily inserted into the block. The number of holes in the fixture correlates to the number of filter wells in the device. Multiple parallel series of these holes may be machined, molded, or caused by other means to be formed in the block so that multiple 8 tube PCR strips may be processed at one time. In this case, as an example, one 8 tube PCR strip would be used for removing the interstitial fluid and a second 8 tube PCR strip would be used to collect the sample. Other modifications made to these rotors can allow for recovery of the interstitial liquid in a tray, thus requiring only one 8 tube PCR strip. This method has the advantage of being able to directly dry the samples in the 8 tube PCR strips immediately after collection, if this is part of the purification protocol.

It will be apparent to those skilled in the art that the filtration device described here has many applications in the general field of sample preparation for, but not limited to, molecular biology, biochemistry, immunology, and analytical chemistry. Similarly, it will be understood that samples may contain components with a wide range of molecular sizes, and that a specific separation may require the use of a specific gel filtration matrix with a specific exclusion limit. The filtration device described herein may be constructed to contain a gel filtration matrix with any available exclusion limit commonly known to those skilled in the art. Typical applications of filtrations which may be accomplished by the device of the present invention include, but are not limited to, desalting peptides and oligonucleotides, removal of non-incorporated labels from nucleic acid or protein labeling reactions, determination of binding constants, and removal of excess terminator reaction products from automated DNA sequencing reactions prior to analysis.

Figure 2:
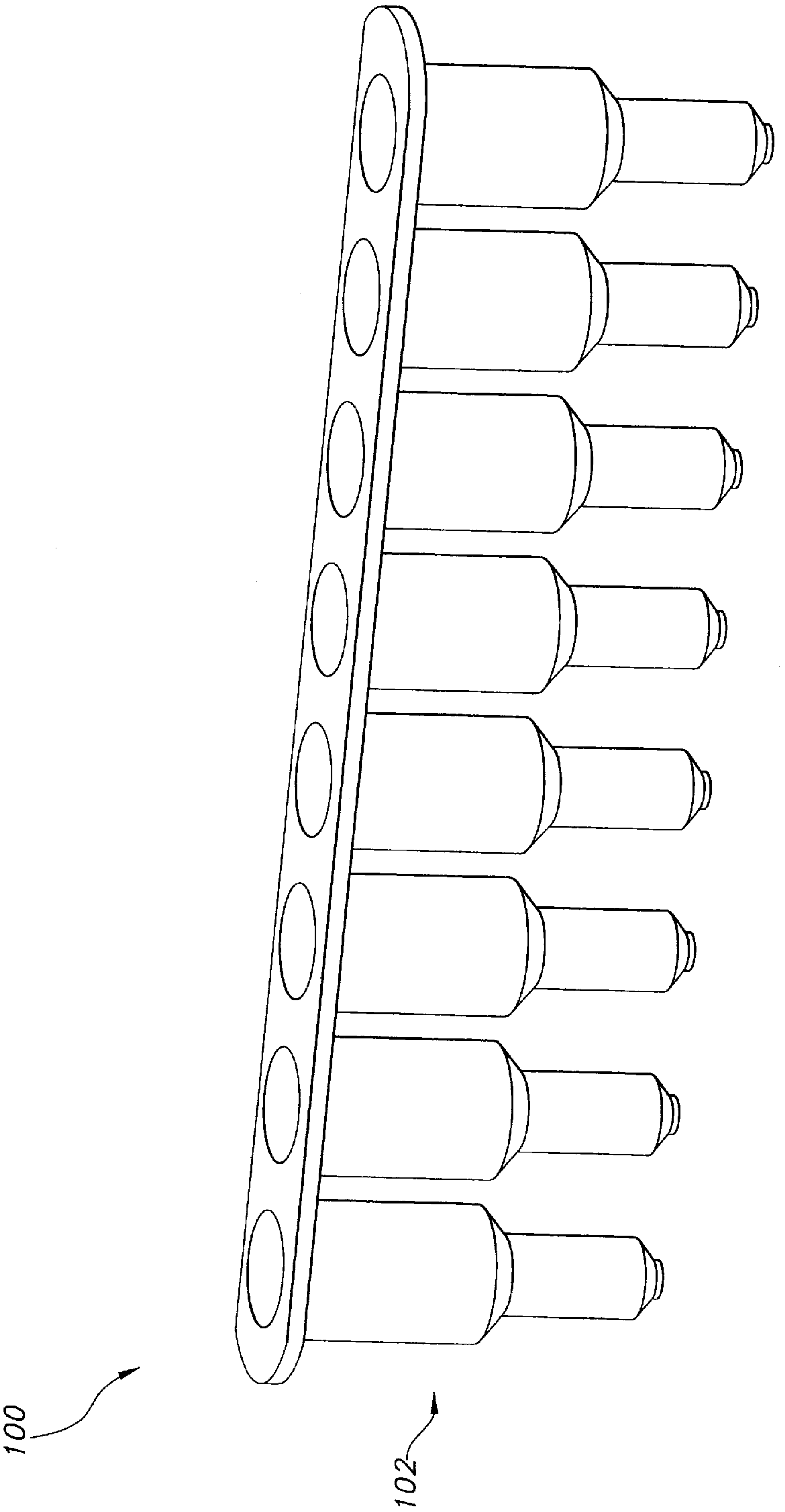
FIG. 2 is a longitudinal view of the device of the present invention showing the device with the enclosures on the filter end of the device removed.

FIG. 1 is a longitudinal view of the device 100. The device 100 consists of a plurality of filter wells 102, desirably four or eight, each of which has an opening 118 at one end and each of which is closed on the other end by a removable closure 114. Opening 118 and annular connector 112 define a passageway with fluid communication therebetween. The filter wells 102 include an upper cylindrically-shaped member 104 for housing a gel filtration matrix and a lower cylindrically-shaped member 108 for housing a gel filtration matrix and a filter element. The upper and lower cylindrically-shaped portions, 104 and 108 respectively, are connected by a conically-shaped annular transition member 106, which is continuous with upper and lower cylindrically-shaped portions 104 and 108, respectively. The lower cylindrically-shaped region or member 108, which houses a filtration material and a filter element, is connected to an annular connector 112 by a conically-shaped annular transition region or member 110. Annular connector 112 is connected to closure member 114. Closure member 114 is removed from the filter well 102 at annular connector 112 by any number of methods, including, but not limited to, cutting with scissors or breaking off with fingers. Closure member 114 may be easily removed from the filter well 102 to allow passage of fluid through the filter well 102 along the passageway defined by opening 118 and annular connector 112. The filter wells 102 are connected by means of an integral tab 116 which connects openings 118 in such a way that the filter wells 102 constitute a single strip even where closures members 114 are removed from annular connectors 112, as illustrated in FIG. 2. Integral tab 116 provides a sealing surface on the device 100, allows the device 100 to be oriented during use, and joins filter wells 102 to each other. When closure member 114 is attached to annular connector 112, filter wells 102 may be filled with fluid materials through opening 118. These materials include, without limitation, a suspension of gel filtration matrix, a slurry of matrix, and the sample to be tested. An adhesive film or foil may be used to seal openings 118 of filter wells 102, thereby permitting the device 100 to be stored for long periods of time without loss of moisture. The filling of filter wells 102 and the sealing of openings 118 in filter wells 102 are accomplished by methods well known to those familiar with the art.

FIG. 2 is an illustration of the device 100, where closure members 114 have been removed from filter wells 102.

Figure 3:
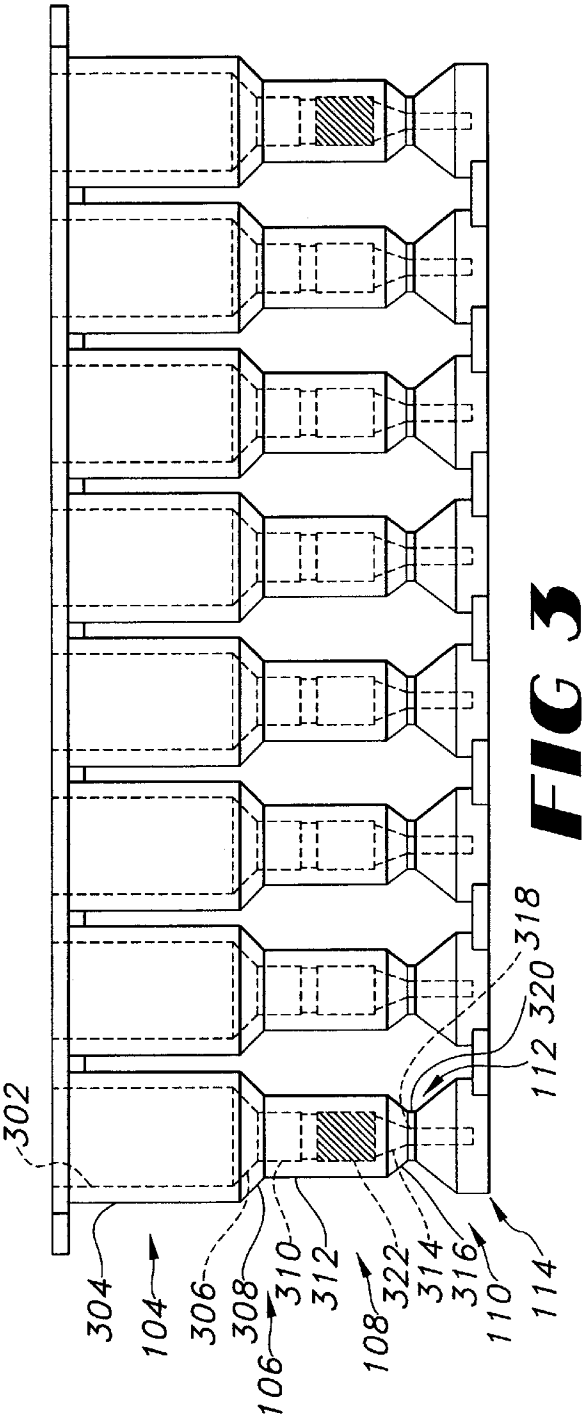
FIG. 3 is a cross-sectional view of the device of the present invention which illustrates the internal housing of an individual filter well.

FIG. 3 is a cross-sectional view of a device 100 and of filter wells 102. Inner surface 302 of upper cylindrically-shaped member 104 defines a substantially smooth inner cylindrically-shaped wall. Outer surface 304 of upper cylindrically-shaped member 104 is continuous with inner surface 302 and defines a substantially smooth outer cylindrically-shaped wall. Together, Inner surface 302 and outer surface 304 define the upper cylindrically-shaped member 104, which may house a gel filtration matrix and into which a sample can be placed. Inner surface 306 of conically-shaped annular transition member 106 defines a substantially smooth inner conical wall. Outer surface 308 of conically-shaped annular transition member 106 is continuous with inner surface 306 and defines a substantially smooth outer conically-shaped wall. Together, Inner surface 306 and outer surface 308 define conically-shaped annular transition member 106, which serves to connect upper cylindrically-shaped member 104 to lower cylindrically-shaped member 108.

Inner surface 310 of lower cylindrically-shaped member 108 defines a substantially smooth inner cylindrically-shaped wall. Outer surface 312 of lower cylindrically-shaped member 108 is continuous with inner surface 310 and defines a substantially smooth outer cylindrically-shaped wall. Inner surface 310 and outer surface 312 define lower cylindrically-shaped member 108, which may serve as a housing for a filter element and for a gel filtration matrix. Shaded area 322 of lower cylindrically-shaped member 108 defines the area into which a filter element may be placed. Inner surface 314 of conically-shaped annular transition member 110 defines a substantially smooth inner conically-shaped wall. Outer surface 316 of conically-shaped annular transition member 110 is continuous with inner surface 314 and defines a substantially smooth outer conically-shaped wall. Together, inner surface 310 and outer surface 312 define conically-shaped annular transition member 110, which serves to connect lower cylindrically-shaped member 108 and annular connector 112. Inner surface 318 of annular connector 112 defines a substantially smooth inner annular wall. Outer surface 320 of annular connector 112 is continuous with inner surface 318 and defines a substantially smooth outer annular wall. Together, inner surface 318 and outer surface 320 define annular connector 112, which serves to connect conically-shaped annular transition member 110 and closure member 114. Inner surface 302 of upper cylindrically-shaped member 104 and inner surface 318 of annular connector 112 define a continuous passageway with fluid communication therebetween.

The device 100 of the present invention may be prepared for use either at the time it is to be used or prior to its intended use. If the device 100 is prepared prior to the time of its intended use, it may be packaged and stored for subsequent laboratory use. Each filter well 102 of the device 100 is prepared by first inserting a filter element through opening 118 and into lower cylindrically-shaped member 108 of filter well 102 with closure member 114 attached thereto. Subsequently, a gel filtration matrix is added to the filter well 102 through opening 118. The filter element acts as a support for the gel filtration matrix and the amount of gel filtration matrix added may be such that the internal housing of the filter well, defined by inner surfaces 302, 306, 310, 314, and 318, is filled either partially or completely with the gel filtration matrix. Each filter well 102 may subsequently be sealed by placing an adhesive film or foil over opening 118 by a technique known to those in the art, thereby allowing the device 100 to be stored for long periods of time without loss of moisture. When the device 100 is to be used, the film or foil seal over opening 118, if applied, is removed and the closure member 114 is removed from filter well 102 by, for example, cutting with scissors or breaking off with fingers, thereby separating closure member 114 from annular connector 112 of filter well 102.

The device 100 is then placed in a centrifugation device and centrifuged for a time sufficient to cause the interstitial fluid in the gel filtration matrix to exit the filter well 102 through the opening defined by annular connector 112. The interstitial fluid is collected in a centrifuge tube and discarded. The filter wells 102 of the device 100 are then placed in a second centrifuge tube, which will serve as a collection tube. The samples to be tested may be placed in the filter wells 102 prior to, or subsequent to, the filter wells being placed into the centrifuge tubes. The filter wells 102 are then centrifuged, causing small molecules in the sample to diffuse into the gel filtration matrix and allowing larger molecules to be expelled through the opening defined by annular connector 112 and collected in the centrifuge tube. The desired molecular weight molecules are then found in the expelled liquid in approximately the same volume as in the original sample.

EXAMPLE 1.

Sephadex G-50 SF (Amersham Pharmacia Biotech) was swollen overnight in deionized water by adding 8.6 g of Sephadex to 100 μL of water. 350 μL of gel filtration slurry was added to each of 8 filter wells of a device of the present invention. Each filter well contained a porous polyethylene frit. The closure member on the end of each filter well was removed by cutting with scissors. The filtration device was placed in a 96 well closed bottom dish and spun for 2–3 minutes at a relative centrifugal force of 1500×gravity in a Hermle centrifuge equipped with a micro plate rotor. After centrifugation, the filtration device was removed from the plate and either 20, 30, 40, or 50 μL of $10^{-4}$M sulforhodamine 101 (molecular weight 606 daltons, Sigma Chemical Company) in 90% water/10% ethanol was added to individual wells. The filtration device was inserted into a row of tubes in a 96 tube PCR plate, and this combination inserted into a 96 well closed bottom micro plate and centrifuged as before. The collected samples were transferred to a cytofluor plate and read on a plate reader using 530 nm excitation filter and a 590 nm emission filter. Table I illustrates the results of this experiment:

TABLE I

Cytofluor Readings for various Sample volumes of $10^{-4}$ M Sulforhodamine 101

| N = 2 | 0 (background) | 20 | 30 | 40 | 50 |
|---|---|---|---|---|---|
| | Volume Added, μL | | | | |
| Average reading | 75 | 79 | 92 | 80 | 137 |
| Sulforhodamine 101 Standards reading | $10^{-8}$M = 396, $10^{-7}$M = 2565, $10^{-6}$M = 9999*, $10^{-5}$M = 9999* | | | | |

*Beyond sensitivity range of instrument at this setting

It can be seen that the limit of detection in this experiment is slightly less that $10^{-8}$M for sulforhodamine 101. The efficiency of removal of a small molecule by the device for sample loads up to 50 μL is approximately 10,000 fold.

EXAMPLE 2.

Filtration devices were prepared as in Example 1, with the exception that centrifugation steps were performed using a Speed Vac SC 110 with a modified micro plate rotor. Effective radius of the rotor is 9 cm and the rotational speed is 1700 RPM. Centrifugation was for 5 minutes. The applied sample was a combination of $10^{-4}$ sulforhodamine 101 in 90% water/101% ethanol and fluorescein-labeled ovalbumin ($10^{-7}$M fluorescein). Filters used were: fluorescein;

485 nm excitation, 530 nm emission; sulforhodamine 101, 530 nm excitation, 590 nm emission.

TABLE II

Cytofluor Readings for various Sample volumes of sulforhodamine 101/fluorescein-labeled ovalbumin

| N = 4 | | 0 | 20 | 40 | 50 |
|---|---|---|---|---|---|
| | | Sample Volume Added, μL | | | |
| Fluorescein reading | | 18 | 4438 | 4070 | 3539 |
| sulforhodamine 101 reading | | 17 | 189 | 286 | 319 |
| Fluorescein standards | $10^{-11}$M | | 17 | 19 | 20 |
| | $10^{-10}$M | | 29 | 46 | 47 |
| | $10^{-9}$M | | 127 | 203 | 283 |
| | $10^{-8}$M | | 857 | 1659 | 1899 |
| | $10^{-7}$M | | 5050 | 6342 | 7721 |
| sulforhodamine 101 standards | $10^{-10}$M | | 24 | 27 | 35 |
| | $10^{-9}$M | | 36 | 64 | 69 |
| | $10^{-8}$M | | 78 | 159 | 179 |
| | $10^{-7}$M | | 405 | 824 | 1043 |
| | $10^{-6}$M | | 3167 | 5151 | 7423 |
| | $10^{-5}$M | | 9999* | 9999* | 9999* |

*Beyond sensitivity range of instrument at this setting

As can be seen from the above table, recovery of the high molecular weight ovalbumin ranges from 87% to 45% over the sample range tested and the efficiency of removal of the small molecular weight sulforhodamine 101 ranged from 4.5 logs to 3.5 logs when an alternative spinning device (modified Savant SpeedVac) was used.

EXAMPLE 3.

Filtration devices were prepared as in Example 1. Single filter wells of uniform barrel dimension from the open end to the frit were also filled with 350 μL of the same slurry used in Example 1. Single filter wells from a prepared filtration device strip were separated from the strip by scissors. These single wells of uniform barrel dimension were compared to the filtration device single wells with the narrowed frit end of the present invention as follows. The single columns were inserted into a 1.5 mL micro centrifuge tube and centrifuged in an Eppendorf 1510 microcentrifuge for 2 minutes at 3000 rpm to remove the interstitial fluid. After centrifugation, the single columns were transferred to new 1.5 mL micro centrifuge tubes and 50 or 60 μL samples of $10^{-3}$ M sodium fluorescein added to the gel bed. The columns were again centrifuged at 3000 rpm for 2 minutes. After centrifugation the liquid in the micro centrifuge tube was transferred to a cytofluor plate and read on a plate reader.

TABLE III

Dye removal using single columns of alternate design

| Device Type | 0 (background) | 50 | 60 |
|---|---|---|---|
| | Sample Volume, μL | | |
| Straight tube, N = 2 | 16 | 287 | 1296 |
| | 17 | 1457 | 1057 |
| Narrow frit end, N = 2 | 16 | 20 | 62 |
| | 17 | 16 | 55 |

TABLE III-continued

| Dye removal using single columns of alternate design | | | |
|---|---|---|---|
| | Sample Volume, $\mu$L | | |
| Device Type | 0 (background) | 50 | 60 |
| Fluorescein standards | $10^{-9}$M = 25, $10^{-8}$M = 94, $10^{-7}$M = 687, $10^{-6}$M = 6497 | | |

The limit of detection in this example is approximately $10^{-9}$M fluorescein. The difference in efficiency of removal of a small molecule for the straight tube versus the narrow frit end is 10 fold at 50 $\mu$L sample load and 30 fold at 60 $\mu$L sample load.

EXAMPLE 4.

Experiment was as in Example 3 except that the sample consisted of 20 $\mu$L of a combination of fluorescein labeled ovalbumin (molecular weight approximately 45,000 daltons) and sulforhodamine 101 (molecular weight 606 daltons) and the matrix was Sephadex G50 F (Amersham Pharmacia Biotech). Liquid from the collection tube was analyzed in a fluorescence polarimeter twice, once at the excitation/emission characteristics of fluorescein and once at the excitation/emission characteristics for rhodamine.

TABLE IV

Fluorescence Readings for Separations of Ovalbumin and Rhodamine Sulfate. Data for 2 runs.

| | Instrument Readings with Fluorescein or sulforhodamine 101 filters | |
|---|---|---|
| Device Style | Fluorescein | Sulforhodamine 101 |
| Straight | 3414 | 178 |
| | 3577 | 394 |
| Narrow Frit | 4264 | 30 |
| | 3040 | 30 |
| Sample Load | 6480 | 11125 |
| | 7672 | 9541 |

Recovery of the high molecular weight ovalbumin averaged 49.2% with the straight tube versus 51.6% for the narrow end tube, while efficiency of removal of the low molecular weight sulforhodamine 101 was 97.3% for the straight tube versus 99.7% for the narrow tube.

EXAMPLE 5.

Figure 5:
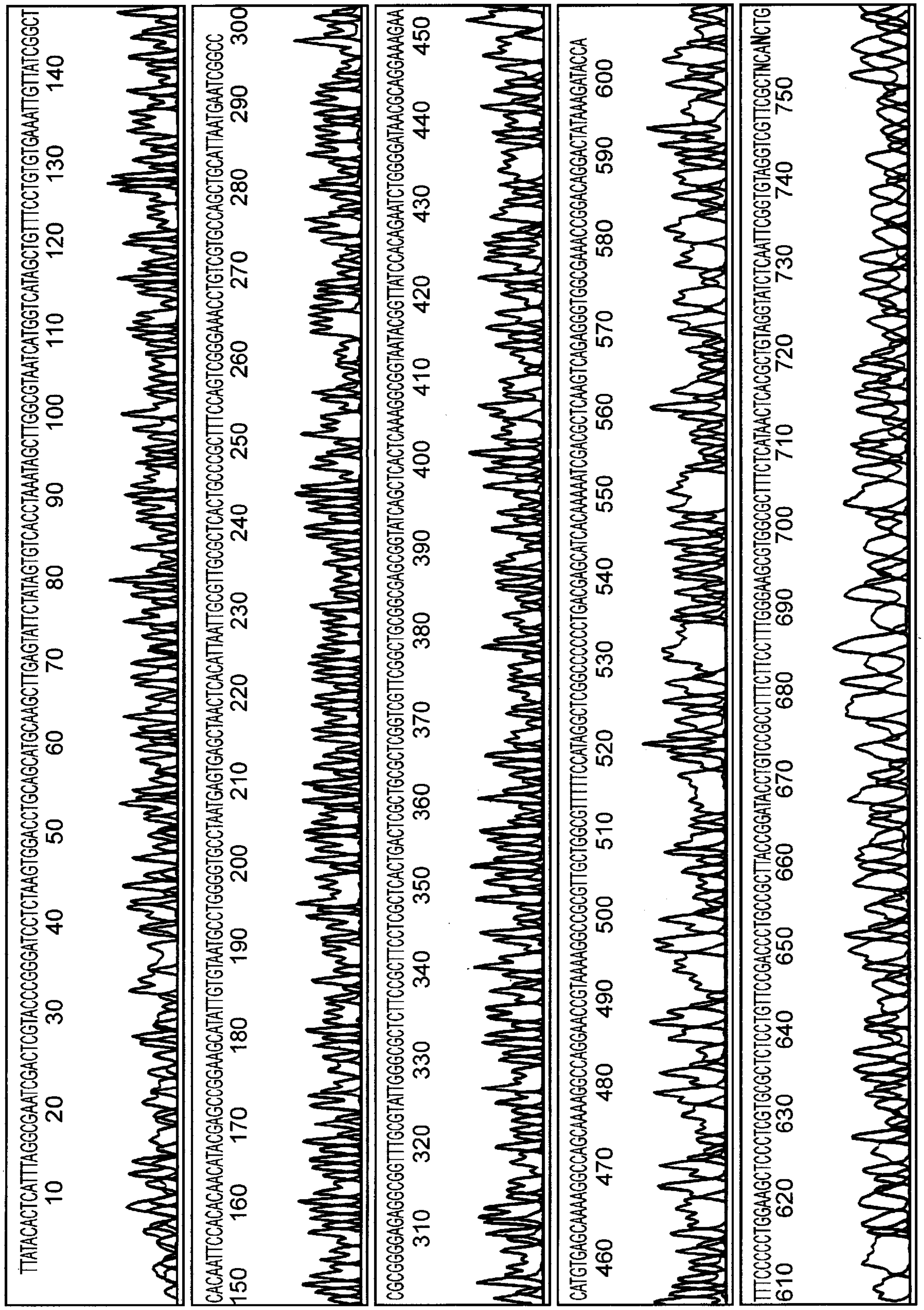
FIG. 5 is a Sequence Electropherogram of the DNA sample collected in Example 5.

Experiment was as in Example 1, except the sample consisted of 20 $\mu$L of a Big Dye sequencing reaction (PE Biosystems) using the PGEM DNA supplied in the kit as template and the −21 M13 primers also provided in kit. The kit protocol was followed and product recovered was loaded onto sequencing gel in an ABI 373 automated DNA sequencer. Resulting gel image was clear of excess dye and the sequence could be read from base 1 to 752 with 100% accuracy (FIG. 5).

What is claimed is:

1. A device for filtering a fluid sample comprising, a plurality of filter wells, each of said filter wells comprising a generally elongate tubular body having a first region with a first diameter and a second region with a second diameter, each of said wells having an opening for receiving sample material located at an end of the tubular body, a dispense opening at a second end of the tubular body for dispensing a filtered material, and a removable closure member which covers said dispense opening when attached to said tubular body, said plurality of filter wells being joined to adjacent wells by one or more joining members, said one or more joining members being unitarily formed with said filter wells.

2. The device of claim 1, wherein said first region has a diameter greater than that of said second region.

3. The device of claim 1, wherein said first and second regions are joined by a transition region.

4. The device of claim 3, wherein said transition region has a third diameter.

5. The device of claim 3, wherein said transition region is conically shaped.

6. The device of claim 4, wherein said third diameter of said transition region decreases from said first region to said second region.

7. The device of claim 1, further including a filter member.

8. The device of claim 7, wherein said filter member is made from a material selected from the group consisting of polypropylene, polyethylene, sintered glass, and wool.

9. The device of claim 1, further including a gel filtration matrix.

10. The device of claim 1, further including a fixture attachable to a rotor of a centrifugation device, said fixture comprising a generally elongate body having a length, opposing sides, a top, and a bottom, said top being adapted to receive said device.

11. The device of claim 10, wherein said fixture is a block made of material selected from the group consisting of wood, metal, and plastic.

12. The device of claim 11, wherein said block is machined or molded and has a series of holes therein which correlate to the number of filter wells in said device.

13. The device of claim 1, wherein said closure members of at least a portion of said filter wells are connected so as to allow for simultaneous removal thereof.

14. A device for filtering a fluid sample comprising, from two to eight filter wells, each of said filter wells comprising a one inch, generally elongate tubular body having a first region with a first diameter and a second region with a second diameter smaller than said first diameter, each of said wells having an opening for receiving sample material located at an end of the tubular body, a dispense opening at a second end of the tubular body for dispensing a filtered material, and a removable closure member which covers said dispense opening when attached to said tubular body, said filter wells being joined to adjacent wells by a planar connecting strip which is substantially planar to said openings and which is unitarily formed with said filter wells, wherein said filter wells are linearly aligned.

15. The device of claim 14, wherein said first diameter is approximately seven millimeters and said second diameter is approximately five millimeters.

16. The device of claim 14, wherein said closure members of at least a portion of said filter wells are connected so as to allow for simultaneous removal thereof.

* * * * *

UNITED STATES PATENT AND TRADEMARK OFFICE

CERTIFICATE OF CORRECTION

PATENT NO. : 6,402,950 B1
DATED : June 11, 2002
INVENTOR(S) : Nix et al.

It is certified that error appears in the above-identified patent and that said Letters Patent is hereby corrected as shown below:

Title page,
Item [74], *Attorney, Agent, or Firm*, delete "...Hoffman..." and insert -- Hoffmann --.

Column 5,
Line 62, delete "...as a fit..." and insert -- as a frit --.

Column 10,
Line 3, delete "...90% water/101% ethanol..." and insert -- 90% water/10% ethanol --.

Signed and Sealed this

Eleventh Day of February, 2003

JAMES E. ROGAN
*Director of the United States Patent and Trademark Office*